UNITED STATES PATENT OFFICE.

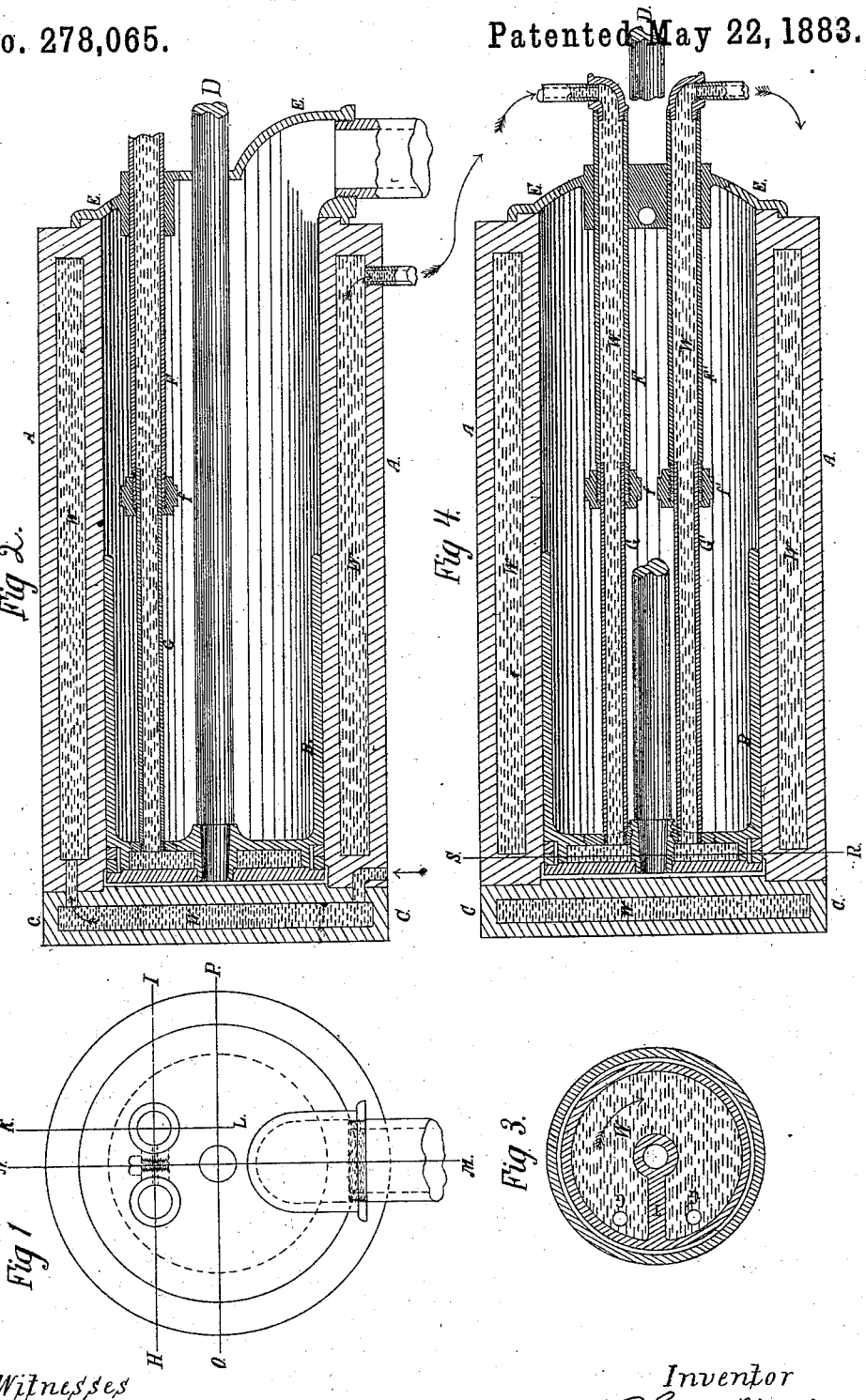

FRANK O. WELLINGTON, OF EAST BRIDGEWATER, MASSACHUSETTS.

HYDROCARBON-ENGINE.

SPECIFICATION forming part of Letters Patent No. 278,065, dated May 22, 1883.

Application filed March 31, 1883. (No model.)

*To all whom it may concern:*

Be it known that I, FRANK O. WELLINGTON, a citizen of the United States, residing at East Bridgewater, in the county of Plymouth and Commonwealth of Massachusetts, have invented a new and useful Improvement in Hydrocarbon-Engines, of which the following is a specification.

My invention relates to single-acting hydrocarbon-engines; and the object of my improvement is to cool the piston of such an engine by means of a water-circulation through the piston-head. I attain this object by the mechanism illustrated in the accompanying drawings, in which—

Figure 1 is an end view of the cylinder, piston-rod, water-circulation pipes, and hood. Fig. 2 is a vertical section of the cylinder and piston, showing the piston as on the line M N of Fig. 1, and showing the water-pipes F G as on the line K L of Fig. 1. Fig. 3 is a sectional view of the piston-head on the line R S of Fig. 4, showing the water-circulation through such piston-head; and Fig. 4 is a horizontal section of the cylinder and piston, showing the water-pipes F G and F' G' as on the line H I of Fig. 1, and showing the piston as on the line O P of Fig. 1.

Similar letters refer to similar parts throughout the several views.

A A is the cylinder. B is the piston-head. C C is the cylinder-head. D is the piston-rod. E E is the hood covering the end of the cylinder farthest from the motive power. F F' are the large water-circulation pipes, firmly clamped in the hood E E. G G' are the small water-circulation pipes, which telescope into the large pipes F F', respectively, through the stuffing-boxes $f f'$. W shows the water-circulation through the jacket of the cylinder, the water-pipes, and the piston, the course of such circulation being indicated by the arrows in the drawings. T is a partition in the piston-head, directing the circulation of the water through the same.

My invention having no relation to the method of driving the piston, no supply or exhaust mechanism is shown.

The working of my invention is as follows: Water is forced by any suitable means into the large pipe F, thence through the smaller pipe, G, into the piston-head, where, following the direction necessitated by the partition T in the upper side of the piston-head, it flows around the piston-rod up to and out of the pipe G' and into F'. The small pipes G and G', reciprocating with the piston, telescope into and out of the larger pipes, F and F'. In practice the same water, either before or after it is passed through the piston, is passed through the jacket of the cylinder.

I am aware that pistons have been heretofore cooled by driving water through one hollow piston-rod, through the piston-head, and out through another piston-rod.

I claim—

1. In a hydrocarbon-engine, the combination, with a solid piston-rod, of the telescoping water-pipes F G and F' G', and a piston-head partitioned to necessitate a circulation of water through the same, substantially as shown.

2. In a hydrocarbon-engine, the combination, with a solid piston-rod, of telescoping water-pipes through which water is led into and out of a piston-head partitioned in such manner as to direct and insure the circulation through such piston-head, substantially as shown.

F. O. WELLINGTON.

Witnesses:
CHAS. H. SWAN,
PAYSON E. TUCKER.